(12) United States Patent
Zonak et al.

(10) Patent No.: US 6,260,465 B1
(45) Date of Patent: Jul. 17, 2001

(54) TRACKED VEHICLE

(75) Inventors: Armin Zonak; Ralf Böttcher, both of Kiel (DE)

(73) Assignee: Mak System Gesellschaft mbH, Kiel (DE)

( * ) Notice: Subject to any disclaimer, the term of this patent is extended or adjusted under 35 U.S.C. 154(b) by 0 days.

(21) Appl. No.: 09/359,474

(22) Filed: Jul. 22, 1999

(30) Foreign Application Priority Data

Jul. 23, 1998 (DE) .............................................. 198 33 154

(51) Int. Cl.$^7$ ...................................................... F41A 23/34
(52) U.S. Cl. ........................ 89/40.03; 89/36.08; 305/120; 305/121
(58) Field of Search ............................. 89/36.08, 40.03; 305/120, 121

(56) References Cited

U.S. PATENT DOCUMENTS

| | | | |
|---|---|---|---|
| 4,068,732 | * | 1/1978 | Granryd ................................... 305/27 |
| 4,647,116 | * | 3/1987 | Trask ...................................... 305/27 |
| 5,178,405 | * | 1/1993 | Brandstadter ........................ 280/705 |
| 5,697,463 | * | 12/1997 | Schlegl ................................. 180/9.5 |

FOREIGN PATENT DOCUMENTS

| | | | |
|---|---|---|---|
| 1954797 | * | 5/1971 | (DE) .................................... 89/36.08 |
| 3725920 | | 2/1989 | (DE) . |
| 4123778 | | 4/1992 | (DE) . |
| 4123771 | * | 1/1993 | (DE) .................................... 89/40.03 |

* cited by examiner

Primary Examiner—Stephen M. Johnson
(74) Attorney, Agent, or Firm—Nils H. Ljungman & Associates

(57) ABSTRACT

A tracked vehicle has a driven track suspension on each side of the hull, whereby the track suspension and the hull are connected by means of a vibration damping material. The track suspension is mounted on a U-shaped bridge element with lateral track supports with the use of a connecting floor plate, whereby each of the track supports is equipped with an electric drive motor as a track drive. The hull is suspended in the bridge element by means of vibration damping elements.

12 Claims, 2 Drawing Sheets

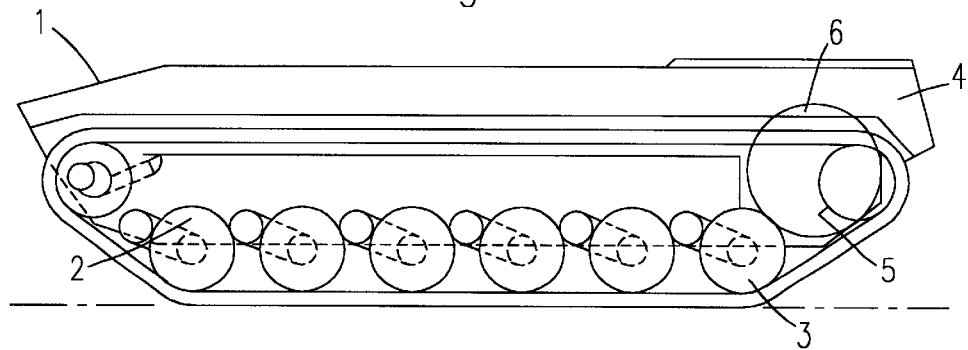
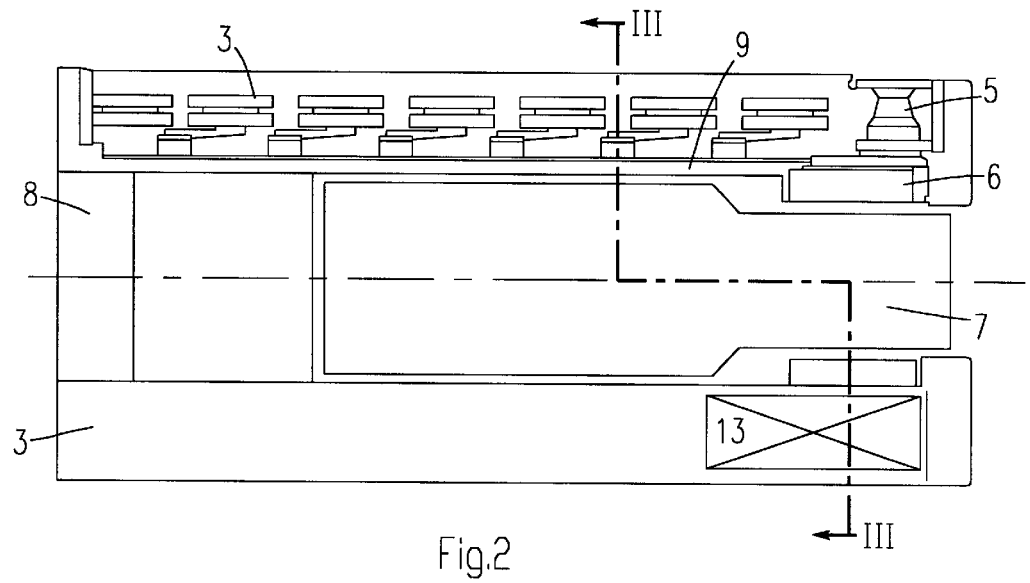

TRACKED VEHICLE

BACKGROUND OF THE INVENTION

1. Field of the Invention

The present invention relates to a tracked vehicle comprising a hull and a driven track suspension on each of two side walls. The track suspension comprises an idler wheel, road wheels with lugs, return rollers and a drive wheel that is meshed with the track. The track suspension and the hull are connected by means of vibration-damping materials.

2. Background Information

A problem experienced with military tracked vehicles is that vibrations that are essentially generated in the track and components of the track suspension can be transferred via the track support on the frame to the rest of the vehicle and thus to the crew inside the hull.

These vibrations and oscillations not only adversely affect the performance of the crew, but also reduce the effectiveness of all of the installed observational or optical and electronic equipment. The vibrations and oscillations may also require the use of additional construction measures to protect the equipment against vibration and shock.

An additional disadvantage is the loud running noise which facilitates auditory detection of a tracked vehicle.

To prevent and dampen vibration, German Patent No. 37 25 920 C2 discloses the use of a decoupled track suspension that is attached to the hull by means of a permanently elastic material.

German Patent No. 41 23 778 C2 further discloses a tracked vehicle in which the two halves of the track suspension are attached on the left and right sidewalls of the vehicle frame by means of a vibration damping material, and the two track supports are connected to one another by means of diagonal ties and struts.

A problem with known configurations is to connect the final drives with the engine located in the front or rear of the vehicle to the track wheels and to decouple the final drives from the vehicle hull, in which the final drives are mounted.

OBJECT OF THE INVENTION

An object of the present invention is, with a generic configuration, to decouple the drives before the hull and to also realize a track support as an autarkic or independent or self-sufficient unit with high rigidity and large mass.

SUMMARY OF THE INVENTION

To achieve this object, the present invention teaches that the track suspension can be mounted on a U-shaped bridge element with lateral track supports and a connecting floor plate, that each of the lateral track supports can be equipped with an electric drive motor and that the hull can be suspended in the bridge element by substantially vibration-damping elements.

This can substantially prevent vibrations from the track suspension and drive motor from being transferred to the hull via the outboard electric drive motors installed on the drive wheel as final drives. Furthermore, the strength and rigidity of the oscillating track drive can be increased by incorporation of the final drive.

The features disclosed hereinbelow disclose additional advantageous embodiments. The following advantages can be achieved:

Increase of the oscillating mass with improved vibration characteristics;

Increased protection against mines and shock, in addition to an intermediate space for decoupling the introduction of shock;

Location of the electric power source with diesel engine and generator outside the hull between the two halves of the track suspension;

Improved protection of the crew inside the hull by means of additional ballistic protection in the track skirts or guards and to the front by means of the connection of the two halves of the track suspension, which can form a stowage and engine compartment or compartments.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

One embodiment of the current invention is shown schematically in the accompanying drawings, wherein:

FIG. 1 is a side view of a tracked vehicle;

FIG. 2 is top view of the vehicle shown in FIG. 1, shown in part in section;

DESCRIPTION OF THE PREFERRED EMBODIMENT

Figure 3:
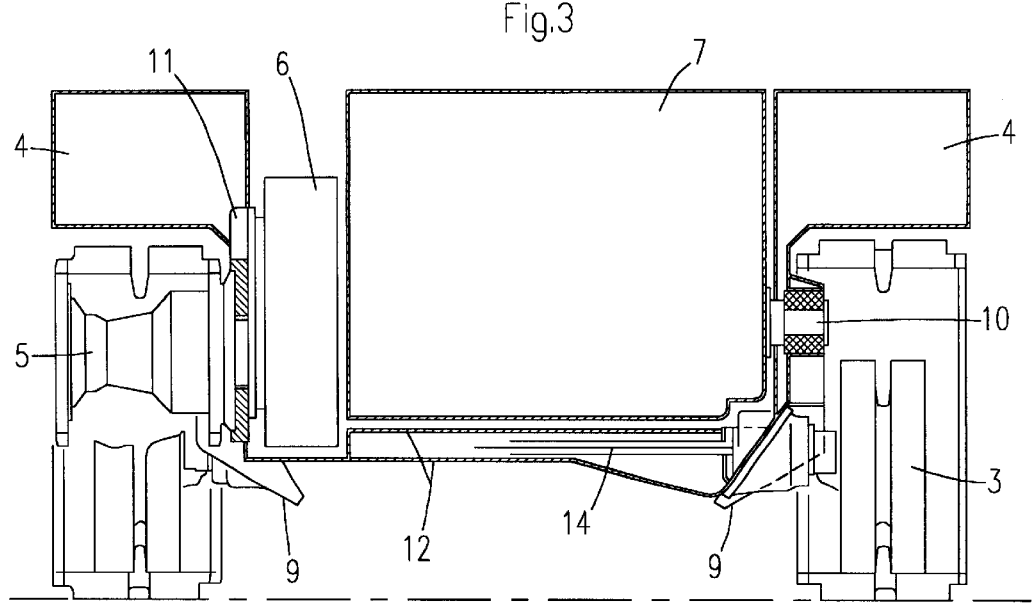
FIG. 3 is a section along Line III—III of FIG. 2.

FIGS. 1, 2 and 3 illustrate at least one embodiment of a tracked vehicle in accordance with the present invention. The illustrated tracked vehicle 1 comprises lateral track supports 9, which are connected via a floor plate 12 and a U-shaped bridge element. A hull 7 is seated in this assembly. The track supports 9 are equipped with idler wheels, road wheels with lugs 3, return rollers and one drive wheel 5 on each side to form a known track suspension.

In at least one embodiment of the present invention, the U-shaped bridge element can comprise the lateral track supports 9, in addition to a floor panel.

The drive wheel 5 forms a unit with the electric drive motor 6 and is held in the track support 9 by means of a bearing plate 11. Useable enclosures 4 can be in the form of track skirts, which track skirts form a structural unit with the track supports 9, and are arranged substantially above the tracks and over substantially the length of the vehicle. In this case, power generation components 13 are located in these enclosures 4, which enclosures are realized as track skirts.

Power generation components, e.g. a diesel engine and electric generator, can also be located on a transverse connecting element 8 between the track supports 9.

A plurality of elastic bearings 10 on both sides of the centrally mounted hull 7 connect the hull 7 to the track supports 9 and the lugs 3. Each bearing 10 can be realized as a pin support, whereby pins fastened to the hull 7 are enclosed in an annular rubber body and fastened to the track support 9 by means of annular outside casing. Other types of bearing supports are also possible within the scope of the present invention.

A floor plate 12 can be realized as a double floor to simultaneously provide protection against mines. The receptacle thus formed can be used to seat transverse torsion bars 14 for the suspension of the road wheels.

In other words and in accordance with at least one embodiment of the present invention, the floor plate 12 can comprise two plates with a space or receptacle between the plates. The transverse torsion bars 14 can then be disposed in this space for suspension of the road wheels.

Figure 4:
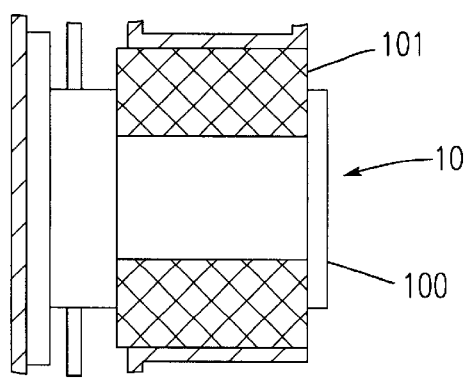
FIG. 4 shows a view of an elastic bearing.

At least one embodiment of an elastic bearing 10 which can be used in embodiments of the present invention can be seen in FIG. 4. This bearing 10 can have a pin 100, encased by an annular casing 101.

One feature of the invention resides broadly in the tracked vehicle comprising a hull and a driven track suspension on both side walls, which track suspension comprises an idler wheel, road wheels with lugs, return rollers and a drive wheel that is meshed with the track, whereby the track suspension and the hull are connected by means of vibration-damping materials, characterized by the fact that the track suspension is mounted on a U-shaped bridge element with lateral track supports 9 and a connecting floor plate 12, that the lateral track supports 9 are each equipped with an electric drive motor 6 as the track drive, and that the hull 7 is suspended in the bridge element by means of vibration damping elements 10.

Another feature of the invention resides broadly in the tracked vehicle characterized by the fact that the track drive 5 is connected to the electric drive motor 6 to form a unit and is located on the track support 9, whereby this unit is freely moveable relative to the hull 7.

Yet another feature of the invention resides broadly in the tracked vehicle characterized by the fact that the hull 7 is connected to the lateral track supports 9 via several elastic bearings 10 and that each bearing 10 is realized as a pin support, whereby pins fastened to the hull 7 are enclosed in an elastic, annular rubber body and fastened to the track support 9 via annular outer housing.

Still another feature of the invention resides broadly in the tracked vehicle characterized by the fact that track skirts in the form of useable compartments 4 are arranged above the track supports 9 over the length of the vehicle and form a structural unit with the track supports 9.

A further feature of the invention resides broadly in the tracked vehicle characterized by the fact that the floor plate 12 is realized as a double floor to provide protection against mines and contains a receptacle for seating torsion bars 14 for the suspension of the road wheel rocker bars.

Another feature of the invention resides broadly in the tracked vehicle characterized by the fact that the floor plate 12 at the front track support 9 of the vehicle includes an installation compartment for power generation components, such as a diesel engine and electric generator.

Yet another feature of the invention resides broadly in the tracked vehicle characterized by the fact that the realization of the installation compartment for power generation components and the realization of the lateral track skirts 4 with track support 9 provide additional frontal and lateral protection elements for the interior hull 7.

Some examples of hybrid engines and control systems therefor which may be utilized in accordance with embodiments of the present invention may be disclosed in the following U.S. Pat. No. 4,305,254 to Kawakatsu et al. on Dec. 15, 1981, entitled "Control Apparatus and Method for Engine/Electric Hybrid Vehicle"; and U.S. Pat. No. 4,335,429 to Kawakatsu on Jun. 15, 1982, entitled "Control Apparatus for Engine/Electric Hybrid Vehicle".

Some examples of electric motors which can be operated as generators which may be utilized in accordance with embodiments of the present invention may be disclosed in the following U.S. Pat. No. 5,327,992 to Boll on Jul. 12, 1994, entitled "Method for Controlling a Hybrid Drive Which Drives a Vehicle"; U.S. Pat. No. 5,249,637 to Heidl et al. on Oct. 5, 1993, entitled "Hybrid Vehicle"; and U.S. Pat. No. 5,323,743 to Kristiansson on Jun. 28, 1994, entitled "Sure-start Device for Internal Combustion Engine".

Some examples of generators which can be operated as motors which may be utilized in accordance with embodiments of the present invention may be disclosed in the following U.S. Pat. No. 5,272,379 to Sugiyama et al. on Dec. 21, 1993, entitled "Power Supply Device for an Electric Vehicle"; U.S. Pat. No. 5,283,471 to Raad on Feb. 1, 1994, entitled "DC Generator and Back-up Engine Starting Apparatus"; and U.S. Pat. No. 5,281,905 to Dhyanchand et al. on Jan. 25, 1994, entitled "Induction Machine Based Hybrid Aircraft Engine Starting/Generating Power System".

Examples of hybrid drive arrangements, such as internal combustion engine-electric generator arrangements, and components associated therewith, such as control arrangements and individual motors for driving corresponding wheels, may be found in the following U.S. Patents which may be utilized in embodiments of the present invention: U.S. Pat. No. 5,327,987, which issued to Abdelmalek on Jul. 12, 1994; U.S. Pat. No. 5,318,142, which issued to Bates et al. on Jun. 7, 1994; U.S. Pat. No. 5,301,764, which issued to Gardner on Apr. 12, 1994; U.S. Pat. No. 5,249,637, which issued to Heidl et al. on Oct. 5, 1993; U.S. Pat. No. 5,176,213, which issued to Kawai et al. on Jan. 5, 1993; U.S. Pat. No. 5,327,992, which issued to Boll on Jul. 12, 1994; U.S. Pat. No. 5,291,960, which issued to Brandenburg et al. on Mar. 8, 1994; and U.S. Pat. No. 5,264,764, which issued to Kuang on Nov. 23, 1993.

Examples of electric and hybrid vehicles, and related components, may be disclosed in the following U.S. Pat. No. 5,251,721 entitled "Semi-hybrid Electric Automobile" to Ortenheim; U.S. Pat. No. 5,004,061 entitled "Electrically Powered Motor Vehicle" to Andruet; U.S. Pat. No. 5,289,100 entitled "System for Powering, Speed Control, Steering, and Braking" to Joseph; U.S. Pat. No. 5,265,486 entitled "Portable External Drive Assembly" to AAMCO Corporation; U.S. Pat. No. 5,289,890 entitled "Drive Unit for Electric Motor Vehicle" to Aisin; and U.S. Pat. No. 5,310,387 entitled "Differential Motor Drive" to Hughes Aircraft Company.

Additional examples of electric vehicles containing components which may be utilized in embodiments of the present invention may be disclosed in the following U.S. Pat. No. 5,166,584 entitled "Electric Vehicle" to Nissan; U.S. Pat. No. 5,161,634 entitled "Electric Vehicle" to Kubota Corporation; and U.S. Pat. No. 5,150,045 entitled "Electric Automobile" to Kaisha.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

U.S. patent application Ser. No. 09/216,158, filed on Dec. 18, 1998, is hereby incorporated by reference as if set forth in its entirety herein.

Federal Republic of Germany Patent Application No. 196 53 203, having the inventors Armin Zonak and Burkhard Rostel, filed on Dec. 20, 1996, and DE-OS 196 53 203, and DE-PS 196 53 203, are hereby incorporated by reference as if set forth in their entirety herein.

The corresponding foreign patent publication applications, namely, Federal Republic of Germany Patent Application No. 198 33 154.1, filed on Jul. 23, 1998, having inventors Armin Zonak and Ralf Böttcher, and DE-OS 198 33 154.1 and DE-PS 198 33 154.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. An armored combat tank comprising:
   a first track and a second track;
   two suspensions, each of said two suspensions being connected to a corresponding one of said two tracks;
   a unit to mount said suspensions;
   said mounting unit comprising:
      a bottom;
      said bottom being substantially horizontal;
      first and second side walls, said first and second side walls being substantially transverse to said bottom; and
      said bottom being disposed and configured to connect said first and second side walls to one another;
   each of said two suspensions being mounted on a corresponding one of said first and second side walls;
   a hull, said hull being configured to contain occupants of said tank;
   a plurality of vibration damping elements;
   said plurality of vibration damping elements being disposed and configured to suspend at least a portion of said hull within said mounting unit;
   said first side wall comprising a first track support to support said first track;
   a first electric motor to drive said first track;
   said first electric motor being connected to said first track support;
   said second side wall comprising a second track support to support said second track;
   a second electric motor to drive said second track; and
   said second electric motor being connected to said second track support;
   each of said two suspensions comprising a drive wheel, each said drive wheel being disposed and configured to mesh with a corresponding one of said two tracks of said armored combat tank,
   said mounting unit being a substantially U-shaped mounting unit;
   each said drive wheel of said two suspensions being connected to a corresponding one of said first and second electric motors;
   each said drive wheel of said two suspensions and its corresponding one of said first and second electric motors being configured to form a unit and are disposed adjacent a corresponding one of said first and second track supports; and
   each said unit being configured to be freely movable with respect to said hull.

2. The tank according to claim 1 wherein:
   each of said plurality of vibration damping elements comprises an elastic bearing; and
   said plurality of elastic bearings are disposed to connect said hull to said first and second track supports.

3. The tank according to claim 2 wherein:
   each of said plurality of elastic bearings comprises:
      a pin;
      an elastic annular body; and
      said elastic annular body is disposed about said pin;
   each of said plurality of pins is fastened to said hull; and
   each of said elastic annular bodies is disposed and configured to connect its corresponding pin to one of said first and second track supports.

4. The tank according to claim 3 wherein:
   each of said first and second track supports comprises a track skirt;
   each of said track skirts comprises a compartment; and
   each of said track skirts is disposed above said first and second track supports over the length of said armored combat tank.

5. The tank according to claim 4 wherein:
   said bottom of said mounting unit comprises a floor plate;
   said floor plate comprises first and second panels disposed one above the other;
   said floor plate has a space between said first and second panels;
   said tank comprises torsion bars; and
   said torsion bars are disposed in said space between said first and second panels.

6. The tank according to claim 5 comprising:
   power generating components, said power generating components comprising:

a diesel engine; and an electric generator.

7. The tank according to claim 6 wherein said compartments of said track skirts are configured and disposed to provide frontal and lateral protection for said hull.

8. A tracked vehicle comprising:

a first track and a second track;

two suspensions, each of said two suspensions being connected to a corresponding one of said two tracks;

a unit to mount said suspensions;

said mounting unit comprising:

a bottom;

said bottom being substantially horizontal;

first and second side walls, said first and second side walls being substantially transverse to said bottom; and said bottom being disposed and configured to connect said first and second side walls to one another;

each of said two suspensions being connected to a corresponding one of said first and second side walls;

a hull, said hull being configured to contain occupants of said tracked vehicle;

a plurality of vibration damping elements;

said plurality of vibration damping elements being disposed and configured to suspend at least a portion of said hull within said mounting unit;

said first side wall comprising a first track support to support said first track;

a first electric motor to drive said first track;

said first electric motor being connected to said first track support;

said second side wall comprising a second track support to support said second track;

a second electric motor to drive said second track;

said second electric motor being connected to said second track support;

each of said two suspensions comprising a drive wheel, each said drive wheel being disposed and configured to mesh with a corresponding one of said two tracks of said tracked vehicle;

said mounting unit being a substantially U-shaped mounting unit;

each said drive wheel of said two suspensions being connected to a corresponding one of said first and second electric motors;

each said drive wheel of said two suspensions and its corresponding one of said first and second electric motors being configured to form a unit and being disposed adjacent a corresponding one of said first and second track supports; and each said unit being configured to be freely movable with respect to said hull.

9. The tracked vehicle according to claim 8 wherein:

each of said plurality of vibration damping elements comprises an elastic bearing; and said plurality of elastic bearings are disposed to connect said hull to said first and second track supports.

10. The tracked vehicle according to claim 9 wherein:

each of said plurality of elastic bearings comprises:

a pin;

an elastic annular body; and said elastic annular body being disposed about said pin;

each of said plurality of pins is fastened to said hull; and each of said elastic annular bodies is disposed and configured to connect its corresponding pin to one of said first and second track supports.

11. The tracked vehicle according to claim 10 wherein:

each of said first and second track supports comprises a track skirt;

each of said track skirts comprises a compartment; and each of said track skirts is disposed above said first and second track supports over the length of the tracked vehicle.

12. The tracked vehicle according to claim 11 wherein:

said bottom of said mounting unit comprises a floor plate;

said floor plate comprises first and second panels disposed one above the other;

said floor plate has a space between said first and second panels;

said tracked vehicle comprises torsion bars;

said torsion bars are disposed in said space between said first and second panels;

said tracked vehicle further comprises power generation components, said power generation components comprising:

a diesel engine; and an electric generator;

said compartments of said track skirts are configured and disposed to provide frontal and lateral protection for said hull.

* * * * *